(12) United States Patent
Willis

(10) Patent No.: US 7,728,907 B2
(45) Date of Patent: Jun. 1, 2010

(54) METHOD AND SYSTEM FOR MPEG CHROMA DE-INTERLACING

(75) Inventor: Donald Henry Willis, Indianapolis, IN (US)

(73) Assignee: Thomson Licensing, Issy les Moulineaux (FR)

( * ) Notice: Subject to any disclaimer, the term of this patent is extended or adjusted under 35 U.S.C. 154(b) by 1001 days.

(21) Appl. No.: 11/282,994

(22) Filed: Nov. 18, 2005

(65) Prior Publication Data

US 2006/0077293 A1    Apr. 13, 2006

Related U.S. Application Data

(62) Division of application No. 10/003,565, filed on Oct. 24, 2001, now Pat. No. 7,006,147.

(60) Provisional application No. 60/257,723, filed on Dec. 22, 2000, provisional application No. 60/259,531, filed on Jan. 3, 2001.

(51) Int. Cl.
*H04N 7/01* (2006.01)
*H04N 11/20* (2006.01)
*H04N 9/77* (2006.01)

(52) U.S. Cl. .................. 348/441; 348/444; 348/448; 348/450; 348/453; 348/488; 348/557; 348/663

(58) Field of Classification Search .................. None
See application file for complete search history.

(56) References Cited

U.S. PATENT DOCUMENTS

| 4,608,594 | A | 8/1986 | Nicholson | 358/11 |
| 4,672,445 | A | 6/1987 | Casey et al. | 358/140 |
| 5,041,904 | A | 8/1991 | Higuchi et al. | 358/11 |
| 5,161,006 | A | 11/1992 | Monta et al. | 358/31 |
| 5,568,204 | A | * | 10/1996 | Takamori | 348/705 |
| 5,610,661 | A | * | 3/1997 | Bhatt | 348/446 |
| 5,625,421 | A | | 4/1997 | Faroudja et al. | 348/607 |
| 5,650,824 | A | * | 7/1997 | Huang | 348/453 |

(Continued)

FOREIGN PATENT DOCUMENTS

EP    1005227 A    5/2000

(Continued)

OTHER PUBLICATIONS

Communication from EPO (Oct. 28, 2005).

*Primary Examiner*—Brian P Yenke
(74) *Attorney, Agent, or Firm*—Robert D. Shedd; Vincent E. Duffy; Michael A. Pugel

(57) ABSTRACT

A method (300) of converting interlaced Moving Picture Experts Group (MPEG) video signals to progressive video signals can include receiving an interlaced video signal representing a luma component specifying luma lines and a chroma component specifying chroma lines (310) wherein the chroma component can specify approximately one-half the number of lines of the luma component. The interlaced video signal can be decoded and the number of the chroma lines can be increased to approximately the same as the number of the luma lines (320). The number of chroma lines of the interlaced video signal then can be decreased (340), to substantially reverse the previous increase. The interlaced video signal then can be deinterlaced to produce a progressive video signal (350), which can be processed further (360) as needed.

14 Claims, 5 Drawing Sheets

U.S. PATENT DOCUMENTS

| | | | |
|---|---|---|---|
| 5,790,197 A | 8/1998 | Canfield | 348/453 |
| 5,838,381 A | 11/1998 | Kasahara et al. | 348/458 |
| 5,844,617 A | 12/1998 | Faroudja et al. | 348/441 |
| 5,926,220 A | 7/1999 | Linzer | 375/240.25 |
| 5,940,141 A * | 8/1999 | Faroudja et al. | 348/628 |
| 5,982,432 A | 11/1999 | Uenoyama et al. | 375/240.01 |
| 6,055,019 A | 4/2000 | Takahashi | 348/453 |
| 6,118,486 A | 9/2000 | Reitmeier | 348/441 |
| 6,144,412 A | 11/2000 | Hirano et al. | |
| 6,175,389 B1 | 1/2001 | Felts, III et al. | 348/663 |
| 6,188,437 B1 | 2/2001 | Webb | 348/448 |
| 6,297,848 B1 | 10/2001 | Westerman | 348/448 |
| 6,307,592 B1 | 10/2001 | Go | 348/453 |
| 6,317,159 B1 | 11/2001 | Aoyama | 348/458 |
| 6,411,333 B1 | 6/2002 | Auld et al. | 348/441 |
| 6,417,891 B1 * | 7/2002 | Cacciatore et al. | 348/649 |
| 6,421,094 B1 | 7/2002 | Han | 348/569 |
| 6,483,951 B1 * | 11/2002 | Mendenhall et al. | 382/300 |
| 6,493,005 B1 | 12/2002 | Wu | 345/804 |
| 6,501,507 B1 | 12/2002 | Canfield | 348/441 |
| 6,542,196 B1 | 4/2003 | Watkins | 348/448 |
| 6,674,479 B2 | 1/2004 | Cook et al. | 348/453 |
| 6,717,987 B1 | 4/2004 | Scarpino et al. | 375/240.03 |
| 6,741,263 B1 | 5/2004 | Pether | 345/600 |
| 6,822,694 B2 * | 11/2004 | Miyazaki et al. | 348/584 |
| 6,831,701 B2 * | 12/2004 | Willis | 348/446 |
| 7,375,764 B2 * | 5/2008 | Knox et al. | 348/458 |
| 2002/0063793 A1 | 5/2002 | Willis | 348/446 |
| 2003/0085903 A1 | 5/2003 | Hrusecky et al. | 345/519 |
| 2003/0206242 A1 * | 11/2003 | Choi | 348/441 |
| 2003/2062242 | 11/2003 | Choi | 348/441 |

FOREIGN PATENT DOCUMENTS

| | | |
|---|---|---|
| EP | 1005227 A | 5/2000 |
| GB | 2158674 A | 11/1985 |
| GB | 2158674 A | 11/1985 |
| JP | 2000209611 | 7/2000 |

* cited by examiner

| Top Field | Bottom Field |
|---|---|
| 1X | |
| AO | |
| | 2X |
| 3X | |
| | BO |
| | 4X |
| 5X | |
| CO | |
| | 6X |
| 7X | |
| | DO |
| | 8X |

X = Luma Lines

O = Chroma Lines

FIGURE 2

METHOD AND SYSTEM FOR MPEG CHROMA DE-INTERLACING

CROSS-REFERENCE TO RELATED APPLICATIONS

This application is a divisional of U.S. application Ser. No. 10/003,565, filed on Oct. 24, 2001 now U.S. Pat. No. 7,006,147, herein incorporated by reference, and claims the benefit of U.S. Provisional Application No. 60/257,723 which was filed Dec. 22, 2000 and 60/259,531 which was filed Jan. 3, 2001, in the United States Patent and Trademark Office.

BACKGROUND OF THE INVENTION

1. Technical Field

The present invention relates to the processing of video signals, and more particularly, to the conversion of interlaced video formats into progressive video formats known as deinterlacing.

2. Description of the Related Art

Presently, many of the transmitted and broadcast TV signals are interlaced. Many of these signals are transmitted in Moving Picture Experts Group (MPEG) form. For example, the Advanced Television Systems Committee (ATSC) has developed the standard for digital television wherein the signals, referred to as ATSC signals, are transmitted in MPEG form. Some of the ATSC formats are interlaced, for example 480i and 1080i video signals. These MPEG signals are in the so-called 4:2:0 format. Accordingly, the MPEG signals contain chroma, the difference signal portion of the video signal, of half-spatial resolution in both horizontal and vertical directions. In order to display this chroma with the associated luma, the matrixed red, green, and blue portion of the video signal, the chroma must be converted back to 4:4:4 form.

Most MPEG decoders output the chroma component after it has been formatted to match the interlaced luma output. Typically, such MPEG decoders will convert the interlaced 4:2:0 chroma into interlaced 4:2:2 chroma. If the resulting chroma and luma are to be deinterlaced and possibly converted to a different number of lines, the chroma vertical resolution will be degraded if the usual chroma output of the decoder is deinterlaced.

Many new displays, such as plasma, LCD, LCOS, and other "matrix" type displays, are being developed which are inherently progressive, or non-interlaced. Accordingly, in addition to decoding, converting the video signal to 4:2:2 format, and then deinterlacing the video signal, to properly display a video signal on many inherently progressive displays, the video signal must undergo further vertical format conversion. This can result in further degradation of the chroma vertical resolution. For example, in the case where a 1080i signal is to be displayed on a 720p display, most MPEG decoders will convert the 270 lines per field of 4:2:0 chroma to 540 lines per field by vertical interpolation. Typically, both the chroma and luma components of the signal would be deinterlaced producing a 1080p signal. This sequence degrades the vertical resolution. Moreover, the down-conversion of the luma from 1080 to 720 lines, and up-conversion of the chroma from 540 to 720 lines, can further degrade the vertical resolution. The present invention is directed towards reducing this degradation.

SUMMARY OF THE INVENTION

The invention disclosed herein provides a method and system for deinterlacing and vertically format converting an interlaced Moving Picture Experts Group (MPEG) video signal. In accordance with the inventive arrangements disclosed herein, the interlaced video signal is deinterlaced prior to vertically expanding the chroma component of the interlaced video signal to retain a high degree of vertical resolution for the chroma component.

One aspect of the present invention can include a method of converting interlaced video signals to progressive video signals. The method can include receiving an interlaced video signal representing a luma component specifying luma lines and a chroma component specifying chroma lines. The chroma component can specify approximately one-half the number of lines of the luma component. The interlaced video signal can be decoded and the number of chroma lines can be increased to approximately the same as the number of the luma lines. The number of chroma lines of the interlaced video signal can be decreased back to approximately one-half of the number of the luma lines, thereby substantially reversing the step of increasing the chroma lines. The interlaced video signal then can be deinterlaced. Accordingly, the deinterlacing can result in a progressive video signal representing a luma component specifying luma lines and a chroma component specifying chroma lines. The progressive video signal can be processed further as necessary.

Another embodiment of the invention can include a method of converting interlaced MPEG video signals to progressive video signals including receiving an interlaced 4:2:0 formatted video signal. The interlaced 4:2:0 formatted video signal can be decoded and converted to an interlaced 4:2:2 formatted video signal. The interlaced 4:2:2 formatted video signal can be re-converted to an interlaced 4:2:0 formatted video signal, which then can be deinterlaced resulting in a 4:2:0 formatted progressive video signal. The 4:2:0 formatted progressive video signal can be processed further as may be necessary.

Another aspect of the invention can include a method of converting interlaced video signals to progressive video signals including receiving an interlaced video signal representing a luma component specifying luma lines and a chroma component specifying non-interpolated chroma lines. The interlaced video signal can be decoded. The non-interpolated chroma lines can be interpolated to produce a processed chroma component specifying interpolated and the non-interpolated chroma lines. The decoded interlaced video signal can be deinterlaced based on the luma lines and the non-interpolated chroma lines. The deinterlacing results in a progressive video signal representing a luma component specifying luma lines and a chroma component specifying chroma lines. As mentioned, the video signal can be processed further as necessary.

Another aspect of the invention can include an MPEG decoder including a chroma vertical interpolator configured to receive an interlaced video signal representing a luma component specifying luma lines and a chroma component specifying non-interpolated chroma lines. The MPEG decoder can be configured to decode the interlaced video signal and interpolate the non-interpolated chroma lines to produce a processed chroma component specifying interpolated and the non-interpolated chroma lines. Notably, the processed chroma component can specify alternate interpolated chroma and the non-interpolated chroma, such that the processed chroma component can include all of the non-interpolated chroma lines.

Another aspect of the invention can include a system for converting interlaced MPEG video signals to progressive video signals. The system can include a decoder configured to receive an interlaced video signal representing a luma component specifying luma lines and a chroma component specifying chroma lines. The chroma component can specify approximately one-half the number of lines of the luma component. The decoder can be configured to decode the interlaced video signal and increase the number of the chroma lines to approximately the same as the number of the luma lines. The system also can include a deinterlacer configured to first decrease the number of the chroma lines of the interlaced video signal back to approximately one-half of the number of the luma lines, substantially reversing the increasing step. The deinterlacer then can be configured to deinterlace the interlaced video signal. A processor can be included which can be configured to coordinate the decoder and the deinterlacer.

Another embodiment of the invention can include a system including a decoder configured to receive an interlaced video signal representing a luma component specifying luma lines and a chroma component specifying non-interpolated chroma lines. Notably, the decoder can be configured to decode the interlaced video signal and interpolate the non-interpolated chroma lines to produce a processed chroma component specifying interpolated and the non-interpolated chroma lines. In that case, a deinterlacer can be included which is configured to deinterlace the decoded interlaced video signal based on the luma lines and the non-interpolated chroma lines. Still, a processor can be included. The processor can be configured to coordinate the decoder and the deinterlacer.

BRIEF DESCRIPTION OF THE DRAWINGS

There are shown in the drawings embodiments which are presently preferred, it being understood, however, that the invention is not so limited to the precise arrangements and instrumentalities shown.

FIG. 2 is a spatial vertical diagram depicting 4:2:0 chroma lines produced in the decoder, relative to the decoded luma lines.

DETAILED DESCRIPTION OF THE PREFERRED EMBODIMENTS

The invention disclosed herein provides a method and system for deinterlacing and vertically format converting an interlaced Moving Picture Experts Group (MPEG) video signal. In accordance with the inventive arrangements disclosed herein, the interlaced video signal is deinterlaced prior to vertically expanding the chroma component of the interlaced video signal. Accordingly, the invention retains a high degree of vertical resolution for the chroma component (which is, at most, 50% of the luma vertical resolution) when performing deinterlacing and chroma vertical format conversions.

Figure 1:
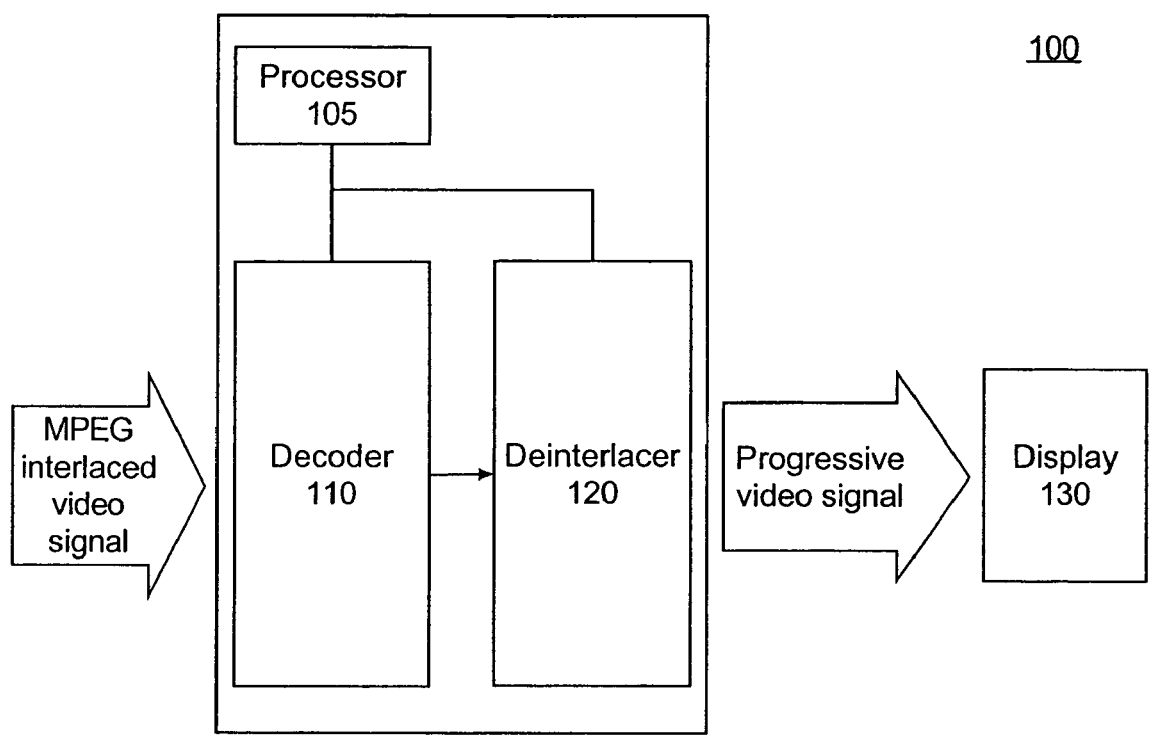
FIG. 1 is a schematic diagram illustrating an exemplary system for converting interlaced video formats to progressive video formats in accordance with the inventive arrangements disclosed herein.

FIG. 1 is a schematic diagram illustrating an exemplary system 100 for converting interlaced video formats to progressive video formats. As shown in FIG. 1, the system 100 can include an MPEG 2 video decoder module (decoder) 110, an interlace to progressive video processing system (deinterlacer) 120, and a processor 105. The decoder 110 can decode and convert a received, interlaced 4:2:0 formatted MPEG video signal to an interlaced 4:2:2 formatted video signal. Notably, the deinterlacer 120 can be configured to convert a 4:2:2 formatted video signal to a 4:2:0 formatted video signal prior to deinterlacing the video signal. After performing the conversion, the deinterlacer 120 can convert the reformatted video signal to a progressive video signal. The processor 105 can coordinate the actions of the decoder 110 and the deinterlacer 120. Each of the aforementioned components can be communicatively linked through an appropriate data connection, for example a data communications bus or other connection circuitry. Finally, the system can include an imaging system or display device 130 such as a high definition television (HDTV) receiver having a liquid crystal on silicon (LCOS) display or other suitable progressive imager.

The system 100 can receive an interlaced MPEG video signal and convert it to a progressive video signal having a high degree of chroma vertical resolution. In operation, the decoder 110 can receive an interlaced MPEG 4:2:0 formatted video signal. The decoder 110 can decode the interlaced MPEG signal and convert the signal to an interlaced 4:2:2 formatted signal. In accordance with the present invention, the deinterlacer converts the 4:2:2 interlaced signal back to an interlaced 4:2:0 formatted signal, thereby reversing the 4:2:0 to 4:2:2 conversion step done by the decoder 110. Afterwards, the deinterlacer 120 proceeds to process the interlaced 4:2:0 formatted video signal in the optimum order. Specifically, the deinterlacer 120 first deinterlaces the interlaced 4:2:0 formatted video signal and then converts the resulting progressive 4:2:0 formatted video signal into a progressive 4:2:2 formatted video signal. That is, the number of lines of the chroma component can be expanded to be equal to the number of lines of the luma component of the resulting progressive video signal. The video signal can be processed further as necessary depending upon the vertical resolution of the display to which the video signal is to be provided.

The chroma line number expansion, or conversion of the deinterlaced 4:2:0 video signal to a 4:2:2 formatted video signal, can be illustrated in the case where a 4:2:0 formatted 1080p signal is to be displayed on a 720p display. Assuming the video signal has been deinterlaced as described above, the chroma lines can be up-converted from 270 to 540. The video signal can be processed further using a variety of techniques. In one embodiment, the luma lines can be down-converted from 1080 to 720, and the chroma lines can be up-converted from 540 to 720. Alternatively, rather than up-converting the chroma lines from 540 to 720, the chroma lines first can be up-converted from 540 to 1080 lines. According to this embodiment, the luma then can be down-converted from 1080 to 720, and the chroma also can be down-converted from 1080 to 720. Although a 720p display was used for purposes of illustration, any of a variety of display devices having disparate resolutions can be used. Accordingly, it should be appreciated that the luma and chroma each can be up-converted or down-converted as may be required to make the number of luma and chroma lines substantially equal. This processing largely is dependent upon the resolution of the particular display device being used.

With reference to the system of FIG. 1, and as illustrated in FIG. 2, when a conventional MPEG decoder processes the received MPEG signal for interlaced output, the luma is output as is, but the chroma is up-converted to the same number of lines as the luma, and with the same vertical position. In other words, the received MPEG 4:2:0 interlaced signal is decoded and converted into a 4:2:2 interlaced signal. One exemplary process that is utilized by the decoder to create chroma for lines 3 and 5 of luma, may be to utilize lines A and C to derive Cr3 and Cr5. For example, the MPEG decoder may set:

$$Cr3=(5/8)A+(3/8)C \quad Cr5=(1/8)A+(7/8)C$$

The MPEG decoder would derive the rest of the 4:2:2 chroma lines for the top field in the same way, starting with the appropriate pair of 4:2:0 chroma lines.

In a similar fashion, the MPEG decoder, for the bottom field, could derive Cr4 and Cr6 from lines B and D by setting:

$$Cr4=(7/8)B+(1/8)D \quad Cr6=(3/8)B+(5/8)D$$

The present invention reconverts the 4:2:2 interlaced line back to a 4:2:0 interlaced line. For example, A and C can be reconstructed from Cr3 and Cr5 as follows:

$$A=(1/4)(7*Cr3-3*Cr5) \quad C=(1/4)(5*Cr5-Cr3)$$

And for the bottom field, B and D can be reconstructed from Cr4 and Cr6 as follows:

$$B=(1/4)(5*Cr4-Cr6) \quad D=(1/4)(7*Cr6-3*Cr4)$$

Of course, it should be noted that just as A can be calculated from Cr3 and Cr5, so C can be calculated from Cr7 and Cr9 (not shown). This means that one calculation can be implemented and used for all chroma lines of one field. There are many ways these equations can be implemented, and if different equations were used by the decoder in its 4:2:2 conversions, the equations could be reversed for 4:2:2 to 4:2:0 conversions.

Figure 3:
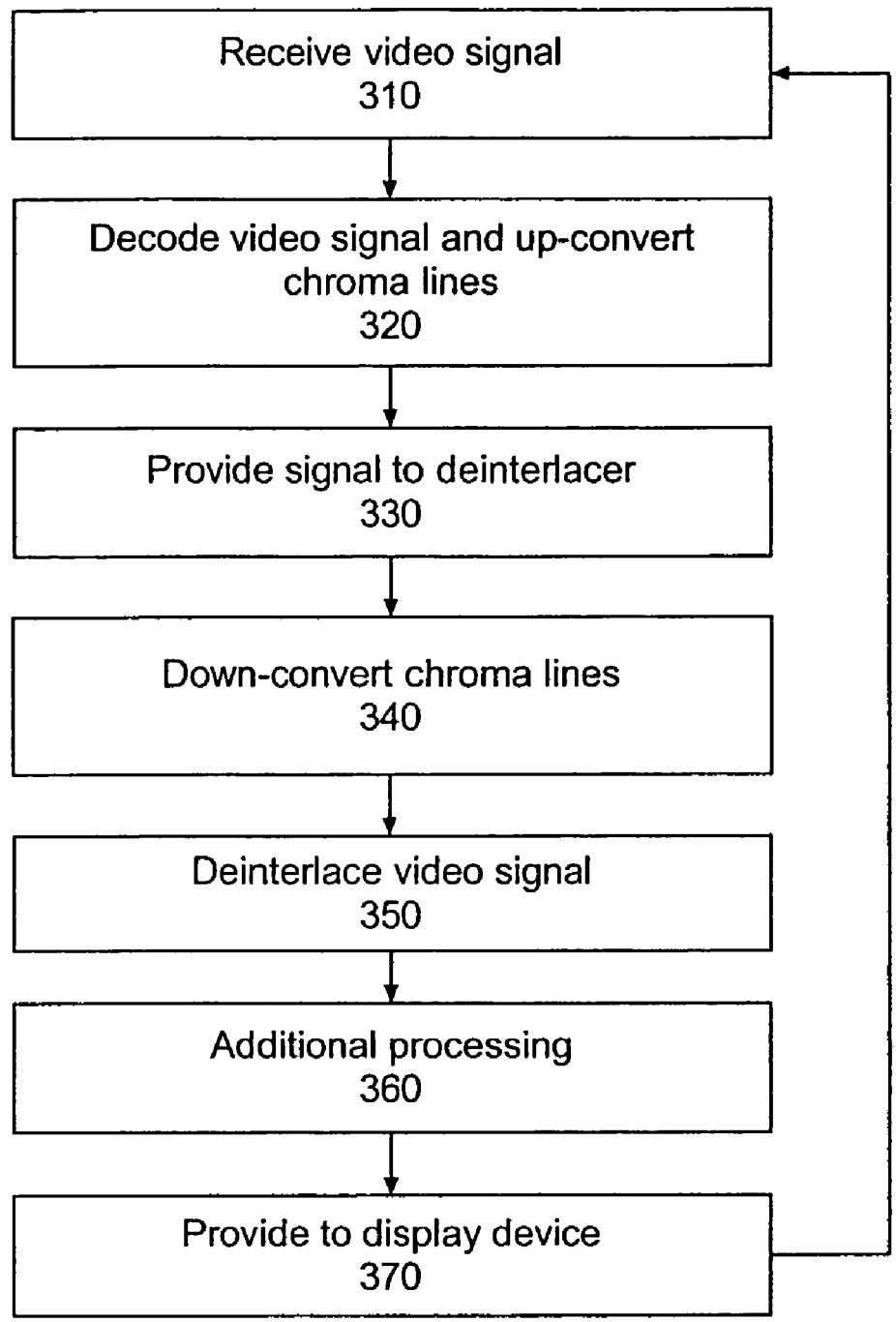
FIG. 3 is a flow chart illustrating an exemplary method of MPEG chroma deinterlacing in accordance with the inventive arrangements disclosed herein.

FIG. 3 is a flow chart 300 illustrating an exemplary method of MPEG chroma deinterlacing as performed by the inventive arrangements of FIG. 1. The method can begin in step 310 where an interlaced MPEG video signal is received. The video signal can be a 4:2:0 formatted video signal. Specifically, the number of chroma lines of the chroma component of the video signal can be approximately one-half the number of luma lines of the luma component of the video signal. In step 320, the interlaced 4:2:0 formatted video signal can be decoded and converted to an interlaced 4:2:2 formatted video signal. That is, typically, a decoder will not only decode the received video signal, but also increase, or up-convert, the number of chroma lines of the chroma component to substantially match that of the luma component.

In step 330, the resulting interlaced 4:2:2 formatted video signal can be provided to the deinterlacer. In step 340, the interlaced video signal can be converted back to an interlaced 4:2:0 formatted video signal. Notably, as described in FIG. 2, the deinterlacer can down-convert the chroma, or effectively reverse the chroma processing of the decoder. Accordingly, the number of chroma lines can be reduced to approximately one-half the number of luma lines. In step 350, the interlaced 4:2:0 formatted video signal then can be deinterlaced. In step 360, having avoided the degradation of the vertical resolution, the resulting progressive video signal can be processed further as necessary. For example, the resulting progressive video signal can be converted to a 4:2:2 formatted video signal or a 4:4:4 video signal. The signal can be vertically format converted as previously described based upon the vertical resolution of the display being used. Finally, in step 370, after any necessary processing, the video signal can be provided to a display device for viewing. After completion of step 370, the method can repeat as necessary to process further video signals.

Figure 4:
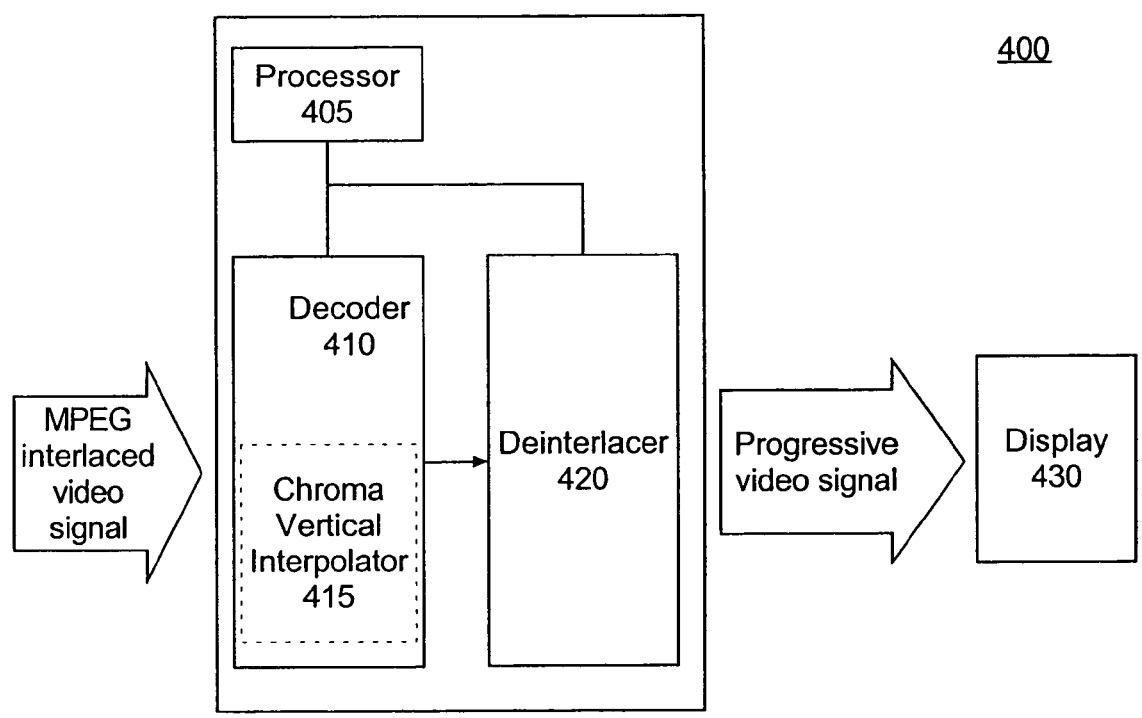
FIG. 4 is a schematic diagram illustrating another exemplary system for converting interlaced video formats to progressive video formats in accordance with the inventive arrangements disclosed herein.

FIG. 4 is a schematic diagram illustrating another exemplary system 400 for converting interlaced video formats to progressive video formats. System 400 is substantially similar to the system of FIG. 1, in that the system 400 can include a decoder 410, a deinterlacer 420, a processor 405, and a display device 430. Notably, however, the decoder 410 can include a modified M PEG decoder chroma vertical interpolator 415. In accordance with this inventive arrangement, the decoder can output a video signal wherein some of the chroma output lines are not interpolated and all of the original 4:2:0 chroma lines can be present at the output at selected times in the output signal as non-interpolated lines. In that case, the deinterlacer 420 need not be configured to reduce the number of chroma lines to be substantially equal to the number of luma lines (convert the 4:2:2 formatted signal back to a 4:2:0 formatted video signal). Rather than reconverting the video signal, in one embodiment of the present invention, every-other line of decoder output chroma can be an original 4:2:0 chroma line, wherein the in-between lines can be interpolated lines. Accordingly, the deinterlacer 420 can be configured to ignore the interpolated chroma lines and keep the original chroma lines. In this manner, the maximum chroma vertical resolution on still (non-moving) pictures can be retained in the deinterlaced output.

Figure 5:
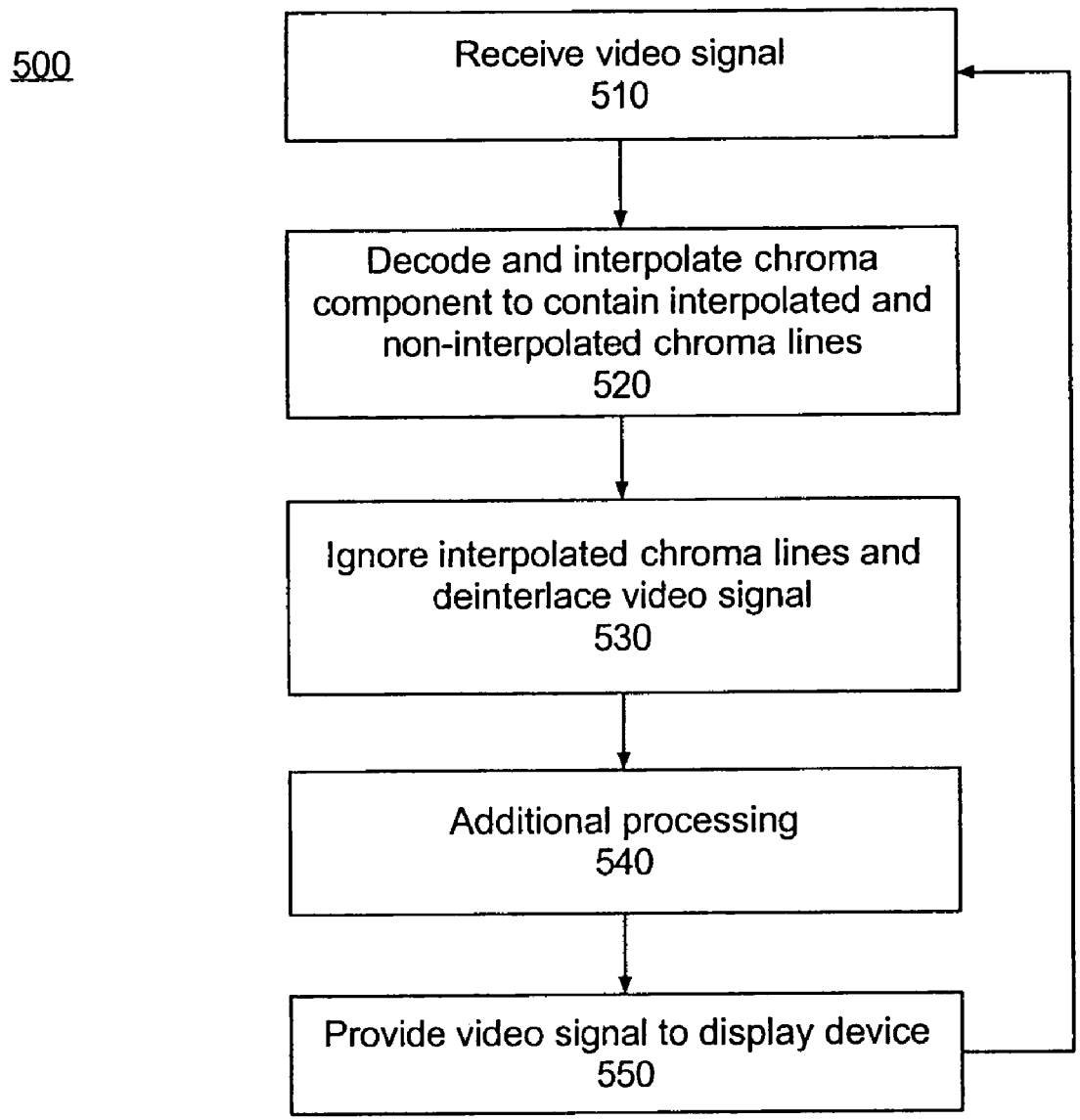
FIG. 5 is a flow chart illustrating another exemplary method of MPEG chroma deinterlacing in accordance with the inventive arrangements disclosed herein.

FIG. 5 is a flow chart 500 illustrating an exemplary method of MPEG chroma deinterlacing as performed by the inventive arrangements of FIG. 4. The method can begin in step 510 where an interlaced MPEG video signal is received. The video signal can be a 4:2:0 formatted video signal wherein the number of chroma lines of the chroma component is approximately one-half the number of luma lines of the luma component of the video signal. In step 520, the interlaced video signal can be decoded. The number of chroma lines can be increased through interpolation. This process, called up-converting the chroma, results in the video signal having approximately the same number of chroma lines as luma lines, for example an interlaced 4:2:2 formatted video signal. Notably, the resulting video signal can include original, or non-interpolated chroma lines. In one embodiment of the present invention, all of the original 4:2:0 chroma lines can be present at the output at selected times in the output signal as non-interpolated lines. For example, every-other line of decoder output chroma can be an original one of the non-interpolated chroma lines, wherein the in-between lines can be interpolated lines.

In step 530, the video signal can be deinterlaced. Notably, however, the interpolated chroma lines can be discarded or ignored during this process. Accordingly, only the non-interpolated chroma lines need be processed in addition to the luma lines. In step 540, having avoided the degradation of the vertical resolution, the deinterlaced video signal can be processed further as previously mentioned. For example, the progressive video signal can be converted to a 4:2:2 or a 4:4:4 formatted video signal. Additionally, the signal can be vertically format converted based upon the particular display used for displaying the video signal. Finally, in step 550, the resulting video signal can be provided to an imaging system or display device. Still, the method can repeat as necessary to process further video signals.

The invention disclosed herein can be embodied in other specific forms without departing from the spirit or essential attributes thereof. Accordingly, reference should be made to the following claims, rather than to the foregoing specification, as indicating the scope of the invention.

The invention claimed is:

1. A method of converting interlaced video signals to progressive video signals, said method comprising:

a) receiving an interlaced video signal representing a luma component specifying luma lines and a chroma component specifying non-interpolated chroma lines;
b) decoding said interlaced video signal and interpolating said non-interpolated chroma lines to produce a processed chroma component specifying interpolated and said non-interpolated chroma lines; and
c) deinterlacing said decoded interlaced video signal based on said luma lines and said non-interpolated chroma lines and not based on said interpolated chroma lines to avoid a vertical resolution degradation, whereby said deinterlacing results in a progressive video signal representing a luma component specifying luma lines and a chroma component specifying chroma lines.

2. The method of claim 1, wherein said step (c) comprises ignoring said interpolated chroma lines.

3. The method of claim 1, further comprising (d) making substantially equal the number of said luma lines and the number of said chroma lines of said progressive video signal.

4. The method of claim 1, further comprising (d) vertical format converting said progressive video signal for displaying on a display having a vertical resolution different from that of said progressive video signal.

5. The method of claim 4, wherein said step (d) further comprises providing said vertical format converted progressive video signal to an imaging system.

6. The method of claim 5, wherein said imaging system comprises a liquid crystal on silicon imager.

7. The method of claim 5, wherein said imaging system further comprises a high definition television receiver.

8. The method of claim 1, wherein said interlaced video signal of said step (a) is a 4:2:0 formatted video signal.

9. The method of claim 1, wherein said step (b) results in a 4:2:2 formatted video signal which represents at least in part said processed chroma component specifying alternate said interpolated chroma and said non-interpolated chroma, such that said processed chroma component includes all of said non-interpolated chroma lines.

10. The method of claim 1, wherein said step (c) results in a 4:2:0 formatted video signal.

11. The method of claim 10, further comprising (d) converting said 4:2:0 formatted progressive video signal to a 4:2:2 formatted video signal.

12. A system for converting interlaced Moving Picture Experts Group (MPEG) video signals to progressive video signals, said system comprising:
a decoder configured to receive an interlaced video signal representing a luma component specifying luma lines and a chroma component specifying non-interpolated chroma lines, and decode said interlaced video signal and interpolate said non-interpolated chroma lines to produce a processed chroma component specifying interpolated and said non-interpolated chroma lines; and
a deinterlacer configured to deinterlace said decoded interlaced video signal based on said luma lines and said non-interpolated chroma lines and not based on said interpolated chroma lines to avoid a vertical resolution degradation.

13. The system of claim 12, further comprising:
a liquid crystal on silicon imager for displaying said deinterlaced video signal.

14. The system of claim 12, further comprising:
a high definition television receiver having a liquid crystal on silicon imager for displaying said deinterlaced video signal.

* * * * *